Jan. 19, 1932.  J. DLESK, JR  1,842,253

ANTIFRICTION BALL BEARING

Filed June 22, 1931  2 Sheets-Sheet 1

Inventor
John Dlesk Jr.
By

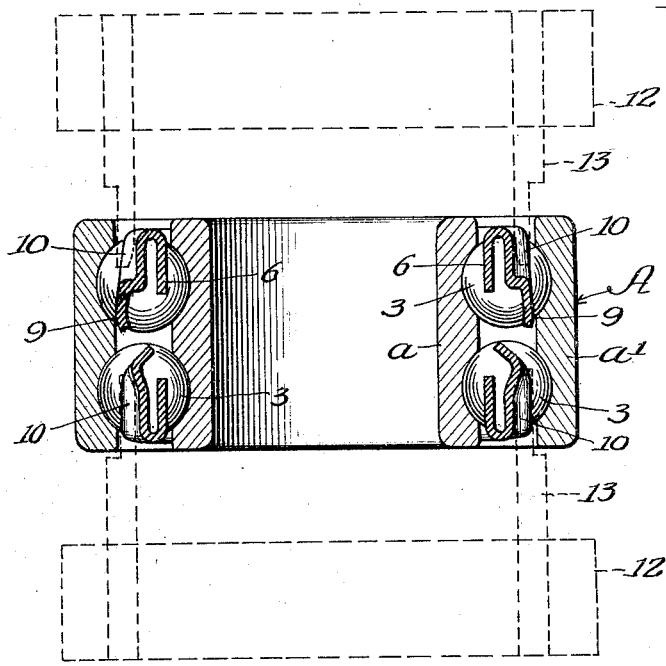
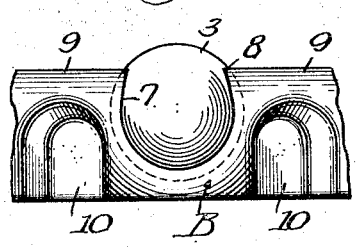
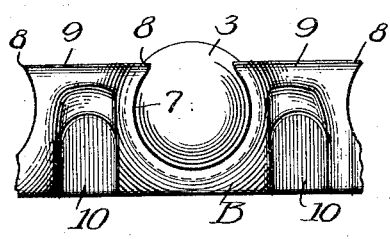
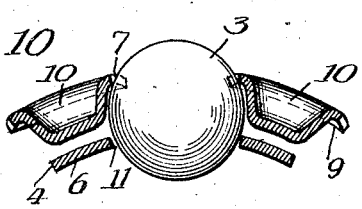
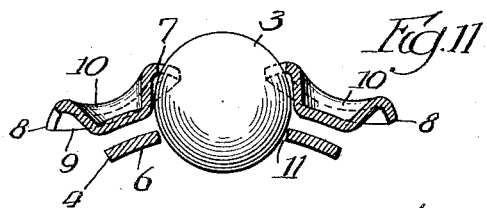

Patented Jan. 19, 1932

1,842,253

UNITED STATES PATENT OFFICE

JOHN DLESK, JR., OF BERWYN, ILLINOIS

ANTIFRICTION BALL BEARING

Application filed June 22, 1931. Serial No. 546,042.

This invention relates to anti-friction ball bearings and process of making same, and relates particularly to ball bearings comprising retainers stamped from an integral blank of suitable sheet metal, and comprising inner and outer flanges connected at one edge in radial spaced relation, the inner flange defining a cylindrical opening fitted to the inner bearing member with only slight clearance and forming a guide on which the retainer pilots, and the other flange extending over and beyond the inner flange and being provided in its marginal edge with openings adapted to receive the anti-friction balls, the corners or angles formed at the free edge of said outer flange on opposite sides of the ball openings therein, being deformed about the balls, in situ in the assembled bearing, to cause said corners to embrace said anti-friction balls, thereby securing said anti-friction balls in engagement with the ball retainer and the ball retainer in position in the bearing, when assembled.

As heretofore constructed, ball bearings of the general type specified, of which I have any knowledge, have embodied certain inherent objectionable features, principal of which being, first, that the retainers were not available for use on double row bearings; and, second, due to the easy flexibility of the sections of the outer flange of the retainer between the ball openings, the engagement of the retainer with the anti-friction balls is insecure, with the result that the retainer is liable to become disengaged from the balls, thereby rendering the bearing entirely ineffective.

Objects of the present invention are to overcome the foregoing objectionable features in ball bearings of the type specified, as heretofore constructed, and to provide a retainer of the general type specified, the outer flange of which will be relatively very strong and rigid and which may be deformed to engage the corners formed at opposite sides of the ball openings with the balls from the attached side of the outer flange, thus rendering the engagement of the retainer with the anti-friction balls much stronger than in such bearings, as heretofore constructed, and also providing for the use of such retainers in double row bearings.

To effect the objects thereof, a ball bearing embodying my invention and improvements and constructed in accordance with my improved process, comprises the various features, combinations of features and details of construction hereinafter described and claimed.

In the accompanying drawings, in which a ball bearing embodying my invention and improvements and constructed in accordance with my improved process is fully illusbefore deformation.

Fig. 7 is an enlarged diagrammatic view illustrating preferable means for effecting final deformation of the retainer to effect interlocking engagement of the retainer with the anti-friction balls.

Figure 1:
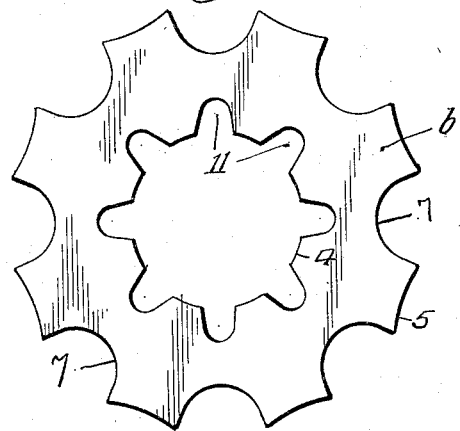
Fig. 1 is a face view of a blank for forming the ball retainer of an anti-friction bearing embodying my invention and improvements, before reformation.

Figs. 8 and 9 are enlarged, fragmentary views of a retainer with anti-friction balls in position therein, before and after the final swedging operation, respectively; and Figs. 10 and 11 are sectional views of the parts shown in Figs. 8 and 9, respectively, in a plane at right angles to the axis of rotation of the bearing and passing substantially through the centers of the balls.

In the present instance, it is believed that my improved process can be best and most clearly described in connection with a description of the construction of the bearing.

Describing the invention with reference to the drawings, an anti-friction bearing embodying my invention and improvements, designated as a whole A, comprises inner and outer bearing members $a$, $a'$, provided, respectively, with ball races, 1 and 2, mounted in which are anti-friction balls 3, which are maintained in desired spaced relation in said ball races by means of a ball retainer, designated as a whole B.

As regards their usual features, and excepting as hereinafter particularly described and pointed out, all of the foregoing parts and features are old and well known and will be understood and can readily be supplied by persons familiar with the art without a description thereof in detail.

The ball retainer B, which is stamped from an integral blank of suitable sheet metal, comprises inner and outer flanges designated 4 and 5, respectively, connected to each other at one edge in radial spaced relation.

The inner flange 4 defines a cylindrical opening 6 on which the retainer pilots in operation, and the other flange 5 extends over and beyond said inner flange and is provided in its marginal edge with openings 7 adapted to receive the anti-friction balls 3, said anti-friction balls being secured in engagement with said retainer, thus securing said retainer in position in the assembled bearing, by deforming the corners 8 of the sections 9 of said outer flange between the different ball openings 7, so that they will extend around and embrace the anti-friction balls at the open sides of said ball openings.

To effect the object of the invention as it relates to increasing the strength and rigidity of the retainer, I attain the object of the invention by depressing the outer surface of the flange 5 at its attached edge, between adjacent ball openings 7, as shown at 10, the relation being such that the closed ends of said depressions or recesses will terminate substantially at a plane which passes through the center of the anti-friction balls, as the bearing is assembled for use. Said depressions will operate in an obvious manner, to strengthen and stiffen said retainer, in the manner desired.

As shown, also, the inner flange 4 of the retainer terminates substantially even with the closed ends of said recesses or depressions and said flange is provided with marginal openings 11 which are in substantial radial alignment with the corresponding portions of the ball openings 7 in the outer retainer flange 5.

To produce the completed bearing, the anti-friction balls 3 are inserted into the ball races 1 and 2 in the inner and outer bearing members $a$, $a'$, and the ball retainer B is then inserted in position in the bearing with the anti-friction balls 3 positioned in each set of ball openings 7 and 11 in the flanges 5 and 4, respectively. Having thus assembled the parts of the bearing in contemplated engagement with each other, the corners 8 formed at the free edge of the outer flange 5 at opposite sides of the ball openings 7, are deformed so as to extend around and embrace the anti-friction balls 3, thus securing said balls in operative position in the retainer, and the retainer in operative position in the assembled bearing.

Figure 2:
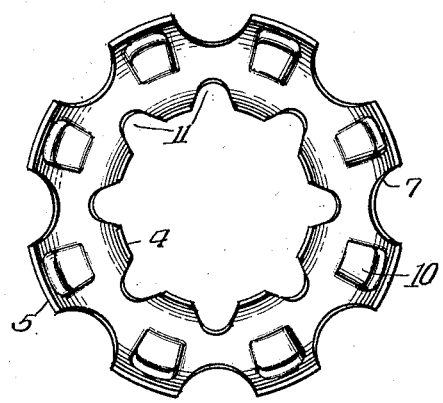
Fig. 2 is a corresponding view of said blank after the initial deforming operation.
Figure 3:
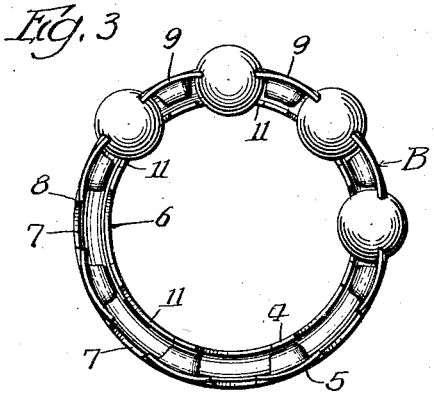
Fig. 3 is a corresponding view of said blank after the second deforming operation, showing a number of balls in position therein.
Figure 4:
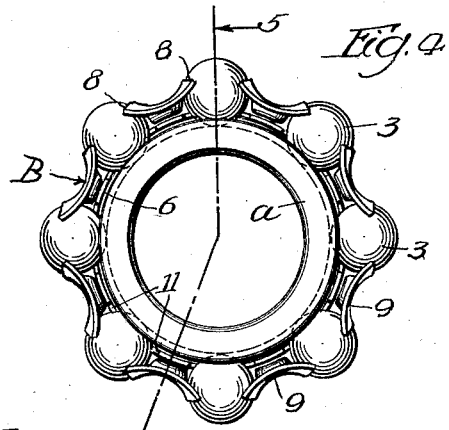
Fig. 4 is a corresponding view of the finished bearing, but with the outer bearing member omitted, and after the final deforming operation to interlock the retainer with the anti-friction balls.
Figure 5:
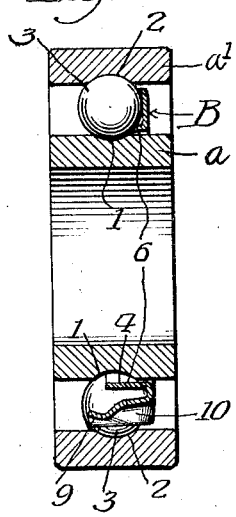
Fig. 5 is a sectional view of the finished bearing, including the outer bearing member, on the line 5—5 of Fig. 4.
Figure 6:
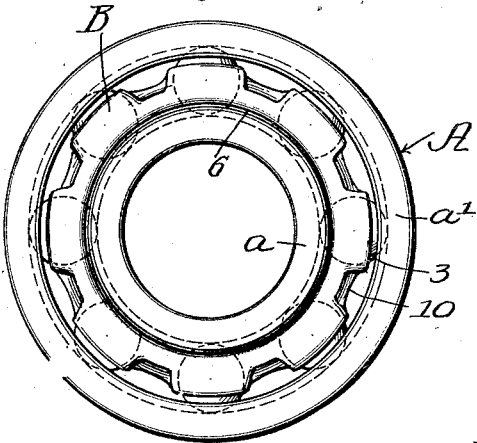
Fig. 6 is a view of the opposite side of a finished bearing from that shown in Fig. 4, including the outer bearing member.

My improved ball retainer B will preferably be stamped from sheet metal and in Figs. 1 to 3, I have shown a blank, designated $b$, and the manner of deforming the same to produce said retainer, Fig. 1 showing the initial stamping, which, as shown, is adapted to be brought to the shape of the finished retainer by deforming operations, the first bringing said blank to the shape shown in Fig. 2, a second to the form shown in Fig. 3, and a final deformation effected about the balls in situ, in the assembled bearing.

In accordance with my improved process, see particularly Fig. 7, in which I have shown my invention and improvements as embodied in a double row bearing, the sections 9 of the outer retainer flange 5 are adapted to be thus deformed at a single operation by means of a suitable swedging tool consisting, as shown, of a body portion 12 secured to and projecting from which are prongs or fingers 13, shaped and proportioned to enter the open ends of the depressions 10 formed in the outer flange 5 of the retainer at its attached edge, the thickness of said prongs or fingers being equal to the radial distance between the bottoms of said depressions and the inner cylindrical surface of the outer bearing member $a'$, with only sufficient clearance to insure contemplated operation. Also, the entering ends of said prongs or fingers are outwardly flared on their inner sides so that they will terminate in a relatively thin edge, which, as said prongs or fingers are forced into the recesses or depressions 10 by pressure applied to the body portion 12 of the swaging tool, will be forced between the sections 9 of the flange 5 and the inner wall of the outer bearing member $a'$, wedging and swaging said sections 9 radially inwardly, thereby causing the corner portions 8 of the sections 9 to embrace the balls contained in the ball opening 7 and, at the same time, expanding the free ends of the flange sections laterally, in a manner tending to force the angles or corners 8 at opposite sides of said opening 7 towards each other, thereby increasing and strengthening the engagement of the anti-friction balls 3 and flange sections with each other and rendering the retainer stronger to resist stresses tending to disengage the retainer and balls from each other, than is the case with any other retainer of the general type specified, of which I have any knowledge.

As explained, the recesses or depressions 10 will so strengthen and stiffen the outer retainer flange 5 at its attached edge that, excepting for deformation of the flange sections 9, as explained, the retainer will be substantially unaffected by the swaging operation.

To illustrate such final swedging operation, I have, in Fig. 7, shown at the top side of said figure, the prongs or fingers 13 of a swedging tool 12 advanced into engagement with the depressions 10 in the outer flange of the retainer, but before they reach the position at which deformation of the retainer at the ends of said depressions begins, and at the bottom side of said figure, have shown said prongs or fingers fully advanced to effect final deformation of the retainer, about the anti-friction balls, as best shown in Figs. 8 to 11.

I claim:

1. A ball bearing comprising inner and outer bearing members provided with ball races, anti-friction balls, and a retainer for spacing said anti-friction balls stamped from suitable sheet metal, comprising radially spaced inner and outer flanges connected to each other at one edge and being otherwise unattached, the outer flange extending over and beyond the inner flange and being provided with notched openings in its free edge to receive the anti-friction balls of the bearing, the corners of the sections of the outer flange between the ball openings embracing the anti-friction balls, and said outer flange being provided with depressions at its attached edge between adjacent ball openings, thereby rendering said ball retainer very strong and stiff to resist stresses to which it will be subjected in process of manufacture and in use.

2. A ball bearing as specified in claim 1, in which the closed ends of the depressions in the outer flange of the retainer are positioned substantially in a common plane at right angles to the axis of the bearing, whereby appreciable deformation of the sections of the outer retaining flange between the ball openings therein to cause the outer corners of said sections to embrace the anti-friction balls, will be limited to the portions of said flange sections between the free edges thereof and the plane of the inner ends of the depressions in said outer retainer flange.

3. A ball bearing as specified in claim 1, in which the closed ends of the depressions in the outer flange of the retainer are positioned substantially in a plane passing through the centers of the anti-friction balls.

4. A ball bearing comprising inner and outer bearing members provided with ball races, anti-friction balls, and a retainer for spacing said anti-friction balls stamped from suitable sheet metal, comprising radially spaced inner and outer flanges connected to each other at one edge and being otherwise unattached, the outer flange extending over and beyond the inner flange and being provided with notched openings in its free edge to receive the anti-friction balls of the bearing, the corners of the sections of the outer flange between the ball openings embracing the anti-friction balls, and said outer flange being provided with depressions at its attached edge between adjacent ball openings thereby imparting such strength and stiffness thereto that the projections at the free edge of said flange formed by the ball openings may be deformed in situ to embrace the anti-friction balls, by a swedging tool applied thereto through the depressions in the attached edge of said flange without detrimentally distorting other parts of the ball retainer.

In witness that I claim the foregoing as my invention, I affix my signature this 19th day of June, 1931.

JOHN DLESK, Jr.